United States Patent [19]

Muto

[11] 4,014,402
[45] Mar. 29, 1977

[54] BICYCLE ENGINE

[75] Inventor: Goro Muto, Funabashi, Japan

[73] Assignee: Tanaka Kogyo Kabushiki Kaisha, Yatsumachi, Japan

[22] Filed: Apr. 30, 1976

[21] Appl. No.: 682,063

[30] Foreign Application Priority Data

May 2, 1975 Japan .............................. 50-58939

[52] U.S. Cl. .............................. 180/33 D; 180/31; 180/74
[51] Int. Cl.² ........................................ B62K 11/12
[58] Field of Search ................. 180/31, 33 R, 33 A, 180/33 D, 74

[56] References Cited
UNITED STATES PATENTS

| | | | |
|---|---|---|---|
| 1,290,699 | 1/1919 | Bates | 180/31 |
| 1,517,338 | 12/1924 | Bessiere | 180/31 |
| 2,350,791 | 6/1944 | Mennesson | 180/74 X |
| 2,896,731 | 7/1959 | Siwek | 180/74 X |
| 2,947,132 | 8/1960 | Shaw | 180/74 X |
| 3,903,980 | 9/1975 | Darras | 180/33 D X |

Primary Examiner—Robert R. Song
Assistant Examiner—Terrance L. Siemens
Attorney, Agent, or Firm—Flynn & Frishauf

[57] ABSTRACT

A bicycle engine which is provided with a transmission roller on the end of a forwardly extending driving shaft for contacting with the front wheel tire, is attached to the bicycle in front of the handle bar via an engine frame attached to the front wheel fork. A lever attached to the engine frame and connected at an end thereof to the side of the transmission roller, is raised or lowered to incline the engine supported by the engine frame in order to secure contact or separation of the transmission roller and the front wheel tire.

16 Claims, 6 Drawing Figures

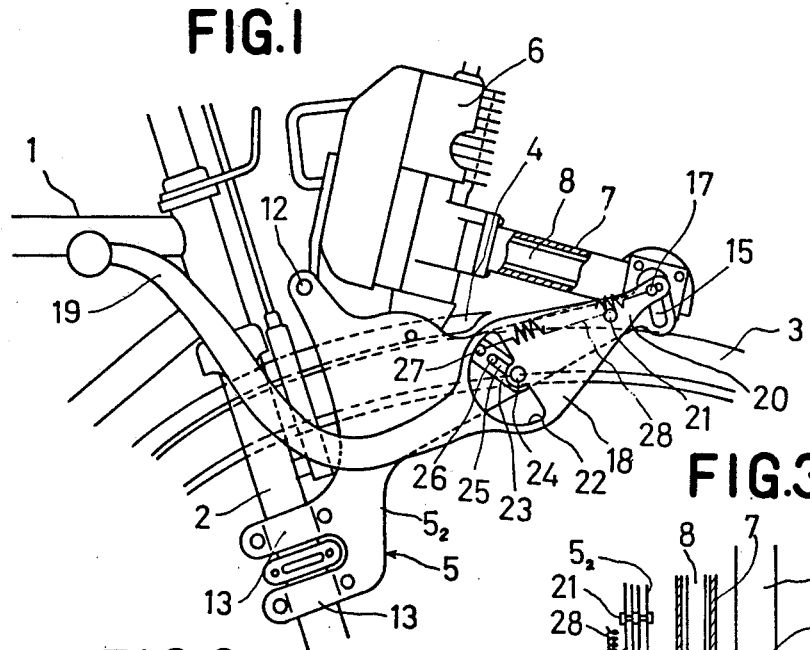
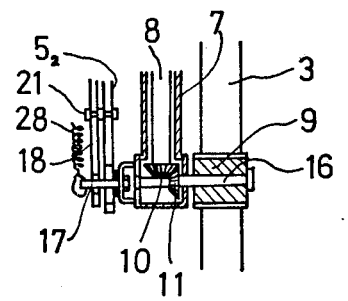
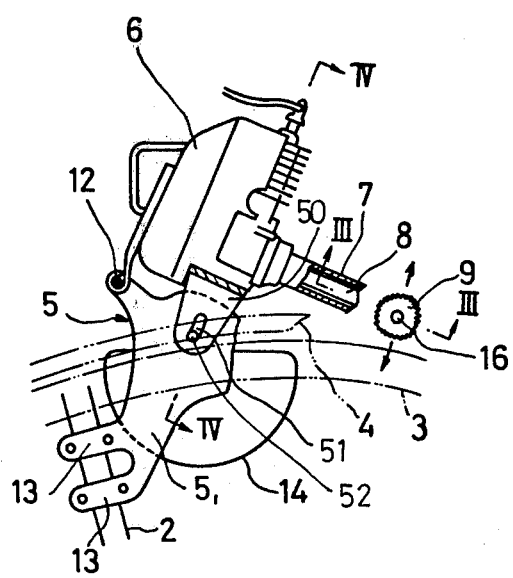
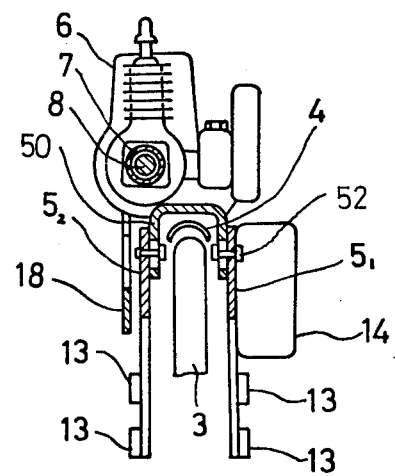

BICYCLE ENGINE

The present invention relates to a bicycle engine and more particularly to a bicycle engine having a transmission roller which is contacted with or moved away from the bicycle tire by selectively inclining the engine.

In the prior art, in order to mount this type of engine to a bicycle body required the extra work of partially taking the bicycle apart or removing some parts of the bicycle. Moreover, prior art engines had so many parts which needed to be fixed to the bicycle that it was difficult for the layman who had no special tools or instruments to attach the engine to the bicycle.

In view of such difficulties, it is an object of the present invention to provide an improved transmission mechanism in the engine which enables the engine to easily be attached by the inexperienced layman to the bicycle, and more particularly to provide such a transmission mechanism which has no couplings with the bicycle to transmit the power and which performs power transmission smoothly while a man is riding on the bicycle.

SUMMARY OF THE INVENTION

In accordance with the present invention, a bicycle engine comprises a forwardly extending drive shaft driven by the engine and a transmission roller at the end of the forwardly extending drive shaft and having an axis of rotation substantially perpendicular to the rotation axis of the drive shaft. An engine frame is mounted to the bicycle and the engine is pivotally mounted to the engine frame so that the engine may be tilted or inclined relative to the frame. A lever means is turnably coupled to the engine frame, the lever means including an operating member which is pivotally connected to the engine and which is further pivotally coupled to the transmission roller via a pin, or the like.

BRIEF DESCRIPTION OF THE DRAWINGS

FIG. 1 is a side view of an engine for a bicycle provided with an inclining operating member in accordance with the present invention showing the transmission roller kept away from the tire;

FIG. 2 is a fragmentary side view of the engine frame shown in FIG. 1;

FIG. 3 is a cross sectional view along the line III — III of FIG. 2;

FIG. 4 is a cross sectional view along the line IV — IV of FIG. 2;

DETAILED DESCRIPTION OF THE DRAWING

Figure 5:
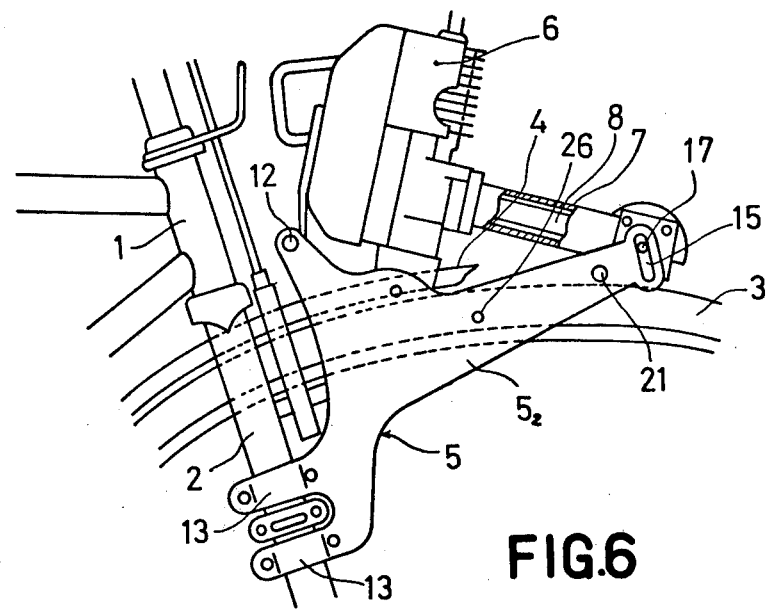
FIG. 5 is a side view of the engine frame from which the inclined member has been taken away.

In FIG. 1, 1 denotes the bicycle frame, 2 the front wheel fork, 3 the front wheel tire, 4 the fender, 5 the engine frame fixed to the front wheel fork 2 and 6 the engine. The engine 6 has a forwardly extending driving shaft 8 protected by a casing or sleeve 7. As shown in FIG. 3, the driving shaft 8 has a transmission roller 9 at its end which is joined perpendicularly to the shaft 8 via bevel gears 10 11, and its lower end behind the said engine is screwed to the support point 12 of the engine frame 5. As seen in FIG. 2, the bottom of the engine is connected to the pin 52 of the engine frame 5 via a holder 50 having an orifice 51, so that when the engine 6 is pivoted about support point 12 the transmission roller 9 is caused to contact the tire 3 or be kept away from the tire 3, depending upon the direction of pivoting of the engine about support point 12. The engine frame 5 comprises two panels $5_1$ $5_2$ positioned on respective opposite sides of the front wheel, and the engine 6 is set over the fender 4 in front of the handle by fixing the panels at their lower ends 13 respectively to the opposite sides of the front wheel fork 2. On one of the side panels $5_1$ of the engine frame is attached a fuel tank 14 as shown in FIG. 2, while the other side panel $5_2$ extends to a position reaching the end of the driving shaft 8 of the engine 6 as shown in FIG. 5. There is provided an oblong opening 15 at the end of the said panel $5_2$ through which is passed a pin 17 which preferably extends substantially parallel and coaxially with respect to the shaft 16 of the transmission roller 9 at the end of the driving shaft.

A lever means, including an inclining operating member 18, one end of which extends as a lever 19, is attached on the side panel $5_2$ of the engine frame 5. Operating member 18 has an end 20 engaged with the pin 17 at the end of the driving shaft. The end 20 is also pivotally screwed to the side panel $5_2$ of the engine frame via a support axis 21. End portion 20, to the rear of the axis 21, has window 22 cut out therefrom behind which is positioned a crank 23 screwed to the center of the window 22 via a support point 24. The crank 23 has an oblong opening 25 to engage the shaft 26 extending from the engine frame panel $5_2$, and at the same time a pin 27 extending at the end of the crank 23 extends outside the window 22 in such a way that the pin 27 turns along the periphery of the window 22 with a spring 28 connecting the pin 27 and the pin 17 of the said driving shaft.

The inclining device for the bicycle engine in accordance with the present invention is so constructed as above mentioned that it is sufficient to press the lever 19 of the operating member 18 down as shown in FIG. 1 in order to keep the transmission roller 9 at the end of the driving shaft raised up and separated from the front wheel tire 3. Thus, the operating member 18 turns with respect to the support axis 21 and its end 20 is lifted to push the pin 17 at the end of the driving shaft aong the orifice 15 opened at the end of the engine frame side panel $5_2$, thereby moving the transmission roller 9 away from the tire 3. At that time, the semi-circular window 22 at the rear of the supporting axis 21 turns downwardly and the crank support point 24 at the center of the said opening also comes to a lower position. Since the axis 26 of the engine frame side panel $5_2$ is engaged with the oblong opening 25 of the crank 23, the pin 27 at the end of the crank turns along the window 22 upwardly as the crank support point 24 moves downward. The spring 28 connecting the pin 27 and the pin 17 at the end of the driving shaft at this time is positioned above the center of the support axis 21 of the operating member 18 and keeps the end 20 of the operating member 18 in a raised position and the transmission roller 9 separated from the tire 3.

Figure 6:
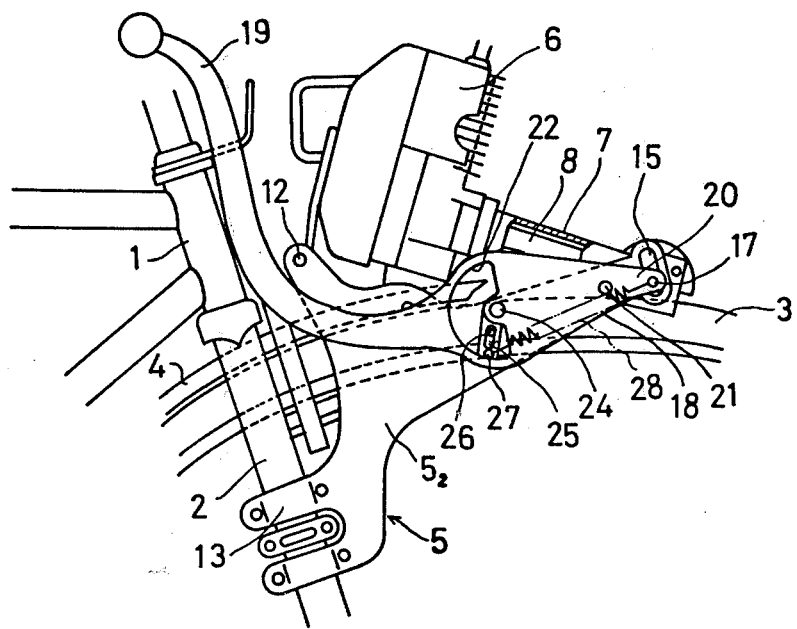
FIG. 6 is a side view showing the transmission roller in contact with the tire.

In order to let the transmission roller 9 contact the tire 3 and to maintain the contact, it is sufficient to pull the level 19 up as shown in FIG. 6. This will cause the end 20 of the operating member 18 to turn downward with respect to the support axis 21, push the pin 17 at the end of the driving shaft down and let the transmission roller 9 contact the tire 3. The semi-circular window 22 will then turn upwardly moving the crank support point 24 to an upper position. Since the axis 26 of the engine frame side panel $5_2$ is engaged with the oblong opening 25 of the crank 23, the pin 27 at the end of the crank will turn to a position below the semicircular window 22 along the periphery thereof. The spring 28 between the pins 27 and 17 will be positioned below the center of the support axis 21 of the operating member 18 and does not act to push the end 20 of the operating member 18, thereby keeping the transmission roller 9 in contact with the tire 3.

As has been explained heretofore, the engine inclining/operating device in accordance with the present invention performs very simply the contacting and separating of the transmission roller 9 with or away from the tire 3 as the engine 6 is inclined horizontally by turning vertically the lever 19 which is an extension of the operating member 18. The operating member 18 is screwed to the side panel of the engine frame via a support axis 21 with the end of the operating member 18 engaged to the pin 17 at the end of the driving shaft.

As the crank 23 is screwed to the operating member 18 and its end is joined to the pin 17 at the end of the driving shaft with a spring, turning the operating member 18 will move the said spring 28 to either above or below the support axis 21, thereby keeping the transmission roller 9 at the end of the driving shaft separated from the tire or in contact therewith.

In the present invention device, the operating member 18 functioning as above mentioned is attached to the engine frame 5 and the lever 19 is not connected to the bicycle body in any way, so that the engine can be attached to the bicycle by simply fixing the engine frame to the front of the front wheel fork.

What we claim is:

1. A bicycle engine arrangement comprising:
   a forwardly extending drive shaft (8) driven by said engine (6);
   a transmission roller (9) at the end of said forwardly extending shaft (8) and having an axis of rotation substantially perpendicular to the rotation axis of said driving shaft;
   an engine frame (5) including means for fixedly mounting same to a bicycle;
   means (12) for pivotally mounting said engine (6) to said frame (5) such that said engine may be inclined freely relative to said engine frame (5); and
   a lever means (18,19) turnably coupled to said engine frame (5), said lever means including an operating member (18) pivotally connected to said engine and said operating member (18) being further coupled to said transmission roller (9) via a pin (17) such that upon turning movement of said lever means relative to said engine frame said engine is selectively inclined to selectively engage said transmission roller with a tire of the bicycle.

2. The bicycle engine arrangement of claim 1 wherein said lever means (18,19) is pivotally connected to said engine frame (5) by means of an axis (21), said arrangement further comprising:
   a crank (23) pivotally coupled to an end portion of said lever means;
   a spring (28) coupled between said pin (17) and a portion of said crank (23) which is spaced from the pivotal connection thereof to said lever means;
   said crank (23) having an oblong opening (25) therein; and
   a fixed projection (26) extending from said engine frame (5) and slideably engaged in said oblong opening of said crank;
   whereby when the lever means is turned with respect to said axis (21) the crank (23) is caused to lower or raise said pin (17) by inclining of said engine (6) by the elasticity of the said spring (28), thereby respectively contacting or removing said transmission roller (9) which is connect to said pin (17) with or away from the bicycle tire.

3. The bicycle engine arrangement of claim 2 wherein said crank (23) includes spring engaging means (27) at an end portion thereof to engage said spring (28).

4. The bicycle engine arrangement of claim 3 wherein said spring engaging means comprises a projection (27) extending from said crank (23).

5. The bicycle engine arrangement of claim 3 wherein said axis (21) is interposed between said crank (23) and said pin (17).

6. The bicycle engine arrangement of claim 5 wherein said lever means has a generally semi-circular window (22) around said fixed projection (26); and said crank (23) is positioned behind said window (22) and extends outside the extremities of said window to allow said spring engaging means (27) at the end of said crank to turn along the periphery of said window.

7. The bicycle engine arrangement of claim 6 wherein said spring engaging means comprises a projection (27) extending from said crank (23).

8. The bicycle engine arrangement of claim 6 wherein said spring (18) is mounted to pass around an end of said axis (21) such that said spring and crank arrangement act as an over-center locking arrangement.

9. The bicycle engine arrangement of claim 5 wherein said spring (18) is mounted to pass around an end of said axis (21) such that said spring and crank arrangement act as an over-center locking arrangement.

10. The bicycle engine arrangement of claim 1 wherein said transmission roller (9) has an axis (16) and comprising bevel gears (10,11) connecting the end of said drive shaft (8) and said axis (16) of said transmission roller (9).

11. The bicycle engine arrangement of claim 1 wherein said engine frame (5) comprises two side panels ($5_1,5_2$) which are adapted to be attached to the front wheel fork (2) of the bicycle with the side panels being positioned on respective opposite sides of the wheel, one of said side panels ($5_2$) having said lever means (18,19) turnably connected thereto.

12. The bicycle engine arrangement of claim 11 comprising a pin member (21) pivotally connecting said lever means to said one side panel ($5_2$) of said engine frame.

13. The bicycle engine arrangement of claim 11 wherein said one side panel ($5_2$) extends to the side of said transmission roller (9) and has a vertical oblong opening (15) therein through which said pin (17) on the side of the transmission roller (9) is inserted so as to guide the movement of said pin (17) when said engine is inclined to lower or raise said pin (17).

14. The bicycle engine arrangement of claim 11 wherein the other side panel ($5_1$) is provided with a fuel tank (14) thereon.

15. The bicycle engine arrangement of claim 1 wherein said engine (6) is pivotally mounted at its lower back to said engine frame by said engine pivotal mounting means (12); said engine having a holder member (50) having an oblong opening (51) therein; and said engine frame (5) having a support passing through said oblong opening (51) of said holder (50) to further support said engine (6).

16. The bicycle engine arrangement of claim 1 wherein a part of said engine frame (5) extends to the side of said transmission roller (9) and has a vertical oblong opening (15) therein through which said pin (17) on the side of the transmission roller (9) is inserted so as to guide the movement of said pin (17) when said engine is inclined to lower or raise said pin (17).

* * * * *

UNITED STATES PATENT AND TRADEMARK OFFICE
CERTIFICATE OF CORRECTION

PATENT NO. : 4,014,402
DATED : March 29, 1977
INVENTOR(S) : Goro MUTO

It is certified that error appears in the above-identified patent and that said Letters Patent are hereby corrected as shown below:

On the initial page of the printed patent, change the address of the Assignee company to read:

--7-1460, Yatsumachi
Narashino, Chiba Pref., JAPAN--;

Column 4, line 9, after "which is" change "connect" to --connected--.

Signed and Sealed this

*fifth* Day of July 1977

[SEAL]

Attest:

RUTH C. MASON
*Attesting Officer*

C. MARSHALL DANN
*Commissioner of Patents and Trademarks*